(12) United States Patent
Janssen et al.

(10) Patent No.: US 6,180,245 B1
(45) Date of Patent: Jan. 30, 2001

(54) METHOD OF REPAIRING SCRATCHED AND/OR ABRADED TRANSPARENT SUBSTRATES AND THE REPAIRED SUBSTRATES

(75) Inventors: Jeffrey R. Janssen, Woodbury; Albert I. Everaerts, Oakdale; Donald R. O'Keefe, Roseville; William F. Sheffield, Oakdale, all of MN (US)

(73) Assignee: 3M Innovative Properties Company, St. Paul, MN (US)

( * ) Notice: Under 35 U.S.C. 154(b), the term of this patent shall be extended for 0 days.

(21) Appl. No.: 09/181,525

(22) Filed: Oct. 28, 1998

(51) Int. Cl.⁷ ...................................................... B32B 17/00
(52) U.S. Cl. ......................... 428/426; 428/142; 428/435; 428/438; 428/412
(58) Field of Search .................... 428/142, 435, 428/438, 412, 426; 156/94, 98, 106, 99, 101, 153, 281

(56) References Cited

U.S. PATENT DOCUMENTS

| | | |
|---|---|---|
| 3,785,102 | 1/1974 | Amos . |
| 4,243,719 * | 1/1981 | Holmes ................................ 428/411 |
| 4,251,572 | 2/1981 | Herliczek et al. . |
| 4,301,193 | 11/1981 | Zuk . |
| 4,332,861 | 6/1982 | Franz et al. . |
| 4,842,919 | 6/1989 | David et al. . |
| 4,985,099 * | 1/1991 | Mertens et al. ......................... 156/94 |
| 5,019,443 * | 5/1991 | Hall ...................................... 428/215 |
| 5,104,929 | 4/1992 | Bilkadi . |
| 5,194,293 | 3/1993 | Foster . |
| 5,512,116 | 4/1996 | Campfield . |
| 5,592,698 | 1/1997 | Woods . |
| 5,622,580 * | 4/1997 | Mannheim ............................ 156/106 |
| 5,633,049 | 5/1997 | Bilkadi et al. . |

FOREIGN PATENT DOCUMENTS

| | | |
|---|---|---|
| 0 192 075 A2 | 8/1986 | (EP) . |
| 2310862 | 9/1997 | (GB) . |
| 62-53832 | 3/1987 | (JP) . |
| 10-167765 | 6/1998 | (JP) . |

OTHER PUBLICATIONS

JP 62–53–832 English Abstract, 1987 (No Month).

(List continued on next page.)

\* cited by examiner

*Primary Examiner*—Timothy M. Speer
(74) *Attorney, Agent, or Firm*—Janice L. Dowdall; Scott R. Pribnow

(57) ABSTRACT

The present invention relates to scratches and/or abraded first substrates such as windows that have been repaired using a bonding material and a second undamaged substrate. Repaired articles and method of repair are provided.

8 Claims, 4 Drawing Sheets

OTHER PUBLICATIONS

Boor, *Ziegler–Natta Catalysts and Polymerizations*, "Polymerization of Monomers," Ch. 19, pp. 512–562, Academic, 1979 (No Month).

ASTM D1004–94a Standard Test Method of Initial Tear Resistance of Plastic Film and Sheeting (No Date/Month).

ASTM D882–97 Standard Test Method for Tensile Properties of Thin Plastic Sheeting (No Date/Month).

ASTM D1003–97 Stantard Test Method For Haze and Luminous Transmittance of Transparent Plastics (No Date/Month).

Transmit Cooperative Research Program, Transportation Research Board, National Research Council, *Enchancement of Vehicle Window Glazing for Vandal Resistance and Durability*, UDR–TR–95–119, Chapters 1–3, pp. 1–11, University of Dayton Research Institute, Mar. 1996.

Transmit Cooperative Research Program, Transportation Research Board, National Research Council, *Procurement Specification Guidelines for Mass Transit Vehicle Window Glazing*, UDR–TR–95–114, University of Dayton Research Institute, Mar. 1996 *3M™ Pat It™Lint and Pet Hair Remover 836–D*, http://www.mmm.com/market/omc/catalog/products/p00/p21/p23.html, Sep. 1, 1998.

*The Word Is Out*, Product Data Sheet 70–0705–7091–9 (75.5)CG, 3M, 1995. (No Month).

*New 3M Pat–it™ Pet Hair Remover*, Product Data Sheet 70–0705–7038(524)BE, 3M, 1994. (No Month).

*3M Pat–it™ Lint and Pet Hair Remover*, Product Data Sheet 70–0705–0819–0, 3M, 1996. (No Month).

*3M™ Scotchtint™ Sun Control Window Film*, 70–0703–7229–0, Sep. 1996.

*3M Scotchlite™ Premium Protective Overlay Film Series*, Product Data Sheet 1160 75–0300–4984–7(117.5)ii, 3M, Nov. 1997.

*3M® Pat It® Pet Hair Remover 836–D*, http://www.mmm.com/market/omc/catalog/products/p00/p21/p23.html, Sep. 1, 1998.

METHOD OF REPAIRING SCRATCHED AND/OR ABRADED TRANSPARENT SUBSTRATES AND THE REPAIRED SUBSTRATES

FIELD OF THE INVENTION

This invention relates to a method of repairing one or both sides of an optically damaged substrate such as rigid glass or plastic window, signage or displays. The invention also relates to the repaired substrates.

BACKGROUND OF THE INVENTION

Windows and glass in public transportation vehicles such as buses or subway trains can be subjected to a tremendous amount of abuse. The windows can be damaged by both incidental scratching during cleaning or they can be maliciously damaged by vandalism. Vandals damage the windows by scratching or abrading the surface of the window with items such as lava rock, diamonds, abrasive papers or abrasive cloths. Vandals can also damage the window by painting or coloring the surface of the window. Cleaning processes have been defined to eliminate damage by painting or coloring. However, scratching of glass by vandals presents a significant problem. In one major city for example, approximately 40 percent of the bus windows have been vandalized by scratching and close to 80 percent of the subway train windows. The public transportation officials now call this type of graffiti "scratchiti". The best approach to stopping graffiti historically has been is to remove the graffiti immediately from the damaged area. This graffiti prevention system which is known as "zero tolerance", has been extremely successful in eliminating the written and painted vandalism. The scratched glass however is extremely difficult and expensive to repair and as a result, the zero tolerance approach to scratchiti prevention and elimination is cost prohibitive. The vandalism issue tarnishes the overall image of an entire city's transportation system. The vandalized glass leads to lower ridership because of the reduced perception of safety on the vehicle by the public. The vandalism ultimately leads to lost revenue for the public transportation system and substantially high repair costs. A cost effective method of restoring the window to its original appearance is needed.

Several approaches have been evaluated to restore the windows to its original appearance. The first approach has been to repair the glass by a multi-step abrasion/polishing method to remove the scrachiti. The abrasion steps remove glass to the depth of the scratch with diamond abrasives and then with subsequently finer grades of diamond or aluminum oxide abrasives the surface of the glass is polished to its original appearance. The abrasive materials are expensive and the time required to completely abrade and polish the surface of the glass can be 6–8 hours depending on the depth of the damaged areas.

The second approach commonly used to repair and protect windows from scratches is to coat the damaged window with an epoxy coating (*Enhancement of Vehicle Glazing for Vandal Resistance and Durability* by Daniel R. Bowman, Mar. 25, 1996, available from the United States Transportation Research Board). The damaged window is typically first scrubbed clean before coating with an epoxy coating. The epoxy coating is used to fill the defects on the windows and restore the window to a state of clarity where signs can be read through the window. To apply the coating, the window must be removed from the vehicle and the window must be cleaned and primed. The coatings are applied and cured in a clean environment. The coatings currently available however are easily scratched by the same method used to scratch the glass. Once the coating is damaged, it is difficult to apply a subsequent coating due to poor adhesion of the coating to the first layer. The process to replace the damaged coating with a new coating is time consuming and expensive.

U.S. Pat. No. 4,301,193 disclosed a method of removing scratches and impregnated dirt from transparent plastic article by applying a polishing formulation containing a mild abrasive to a surface to be treated, polishing the surface with a soft material and applying to the polished surface a liquid silicone formulation and wiping the surface with dry soft material.

U.S. Pat. No. 5,194,293 disclosed a method for restoring weathered plastic surfaces and for enhancing resistance of the treated surface to sunlight by cleaning the surface, polishing with a mild abrasive, applying a first layer of an uncured adhesive material that is ultraviolet curable and applying an outer coat of a compatible curable adhesive over the uncured to form a semi-permanent outer surface on the article. Curing is initiated by exposure to ultraviolet radiation.

GB 2310862 disclosed a resin formulation for repairing a transparent glass member e.g. an automobile windscreen. The fluid resin is injected into a crack, which mixes with the trapped air in the damaged area. A device withdraws the fluid resin and trapped air, separates resin and trapped air and reinject separated resin in the cracked area. Repeated injections are possible because the resin has a select viscosity.

U.S. Pat. No. 5,512,116 disclosed a method of repairing an automobile windscreen by inserting a first resin of selected viscosity into the surface portions of the crack and then inserting a second resin of selected viscosity which is higher than the first into the remainder of the crack.

SUMMARY OF THE INVENTION

The present invention provides fast, cost effective methods of restoring the optical clarity (i.e. decreasing the maximum haze and visible scratches) of a first substrate such as a window or glazing, for example. Also provided are the restored substrates. The article of the invention comprises a first substrate which has been scratched and/or abraded. On top of the first substrate is a bonding layer and a second substrate. The second substrate is typically a pre-made plastic or glass material that forms a protective surface and a rejuvenated surface to the damaged first substrate. The bonding layer typically flows into damaged areas of the first substrate eliminating light diffusion due to the damaged areas of the glass.

The present invention provides an article comprising:

a laminate comprising:

(a) a first substrate, the first substrate having a first major surface and an opposite second major surface, wherein the first substrate comprises a material selected from the group consisting of glass, plastic and combinations thereof, wherein the first substrate has at least one scratch on its first major surface and wherein the first major surface of the first substrate has an $R_{max}$ of greater than about 1 micron;

(b) a second substrate having a first major surface and an opposite second major surface wherein the second substrate comprises immediately before, during and after formation of the laminate a material selected from the group consisting of glass, amorphous plastic in its glassy state, amorphous plastic in its rubbery state, crystalline plastic in its glassy state, crystalline plastic in its rubbery state, and combinations thereof;

(c) a bonding material layer positioned between the first substrate and the second substrate in a manner to form a laminate, wherein the bonding material layer at least partially fills the scratch(es) and is in contact with at least the abraded area of the first major surface of the first substrate and is in contact with at least a portion of the second major surface of the second substrate;

wherein a maximum haze value through the laminate is less than about 20 percent.

In a preferred embodiment the article when subjected to a visual acuity test using a 3 meter Snellen eye chart can allow an observer with 6 meter/6 meter vision to read a line on the eye chart which is indicative of about 6 meter/9 meter vision or better.

In a preferred embodiment the bonding material layer completely fills the scratch(es) in the first substrate.

In a preferred embodiment the maximum haze value through the laminate is less than about 10 percent, more preferably less than about 5 percent, and most preferably less than about 3 percent.

The present invention provides an article comprising:

a laminate comprising:

(a) a first substrate, the first substrate having a first major surface and an opposite second major surface, wherein the first substrate is selected from the group consisting of glass, plastic and combinations thereof;

(b) wherein the first substrate has an abraded and/or scratched area on its first major surface and wherein the first major surface of the first substrate has a maximum haze value;

(b) a second substrate having a first major surface and an opposite second major surface, wherein the second substrate comprises, immediately before, during, and after formation of the laminate, a material selected from the group consisting of glass, amorphous plastic in its glassy state, amorphous plastic in its rubbery state, crystalline plastic in its glassy state, crystalline plastic in its rubbery state, and combinations thereof;

(c) a bonding material layer positioned between the first substrate and the second substrate in a manner to form a laminate, wherein the bonding material is in contact with at least the abraded area of the first major surface of the first substrate and is in contact with at least a portion of the second major surface of the second substrate;

wherein a maximum haze value through the laminate is less than about 20 percent; and wherein the maximum haze value through the laminate is less than the maximum haze value of the first substrate.

Preferably the maximum haze value through the laminate is less than about 10 percent, more preferably less than about 5 percent, and most preferably less than about 3 percent.

The present invention also provides a method comprising:

(a) providing a first substrate, the first substrate having a first major surface and an opposite second major surface, wherein the first substrate is selected from the group consisting of glass, plastic and combinations thereof, wherein the first substrate has at least one scratch on its first major surface and wherein the first major surface of the first substrate has an $R_{max}$;

(b) abrading the first major surface of the first substrate over at least one scratch to provide an abraded area of the first major surface of the first substrate such that the first major surface of the first substrate has an $R_{max}$ which is less than that of step (a), wherein if the abrasion itself does not remove any visible contaminants on the first major surface of the first substrate, the first major surface of the first substrate is cleaned to remove any visible contaminants;

(c) forming a laminate comprising (i) the first substrate, (ii) a second substrate having a first major surface and an opposite second major surface, wherein the second substrate comprises immediately before, during and after the formation of the laminate a material selected from the group consisting of glass, amorphous plastic in its glassy state, amorphous plastic in its rubbery state, crystalline plastic in its glassy state, crystalline plastic in its rubbery state and combinations thereof, and (iii) a bonding material layer, wherein the bonding material layer is positioned between the first substrate layer and the second substrate layer, wherein the bonding material layer is in contact with at least the abraded area of the first major surface of the first substrate and is in contact with at least a portion of the second major surface of the second substrate;

wherein a maximum haze value through the laminate is less than about 20 percent.

In a preferred embodiment of the method at least a portion of the bonding material layer which is brought into contact with the abraded area of the first substrate upon forming the laminate has a stress relaxation value of about 15 to about 100 percent when measured at a temperature at which the laminate is formed.

In a more preferred embodiment of the method at least a portion of the bonding material layer which is brought into contact with the abraded area of the first substrate upon forming the laminate has a stress relaxation value of about 20 to about 90 percent when measured at a temperature at which the laminate is formed.

In one embodiment of the invention the first substrate is rigid and the second substrate is rigid.

In one embodiment of the invention the first substrate is rigid and the second substrate is flexible.

In another embodiment of the article of the invention the bonding material is selected from the group consisting of viscous liquids, viscoelastic solids, and mixtures thereof.

In another embodiment of the article of the invention the bonding material is selected from the group consisting of polyacrylics, silicones, polyolefins (polyoctenes, polyhexene), rubber, polymers and mixtures thereof.

In a preferred embodiment of a method of the invention the maximum haze value through the laminate is less than about 10 percent, more preferably less than about 5 percent, and most preferably less than about 3 percent.

In one embodiment of a method of the invention step (c) comprises the steps of (i) providing a layer of bonding material over the abraded area of the first substrate wherein the bonding material having a stress relaxation value of at least about 15% at a temperature at which the laminate is formed; and (ii) placing the second substrate over the coating in order to form a laminate.

In one embodiment of a method of the invention step (c) comprises the steps of (I) providing a construction comprising
 (i) the second substrate;
 (ii) the layer of bonding material having a stress relaxation value of at least about 15% at a temperature at which the laminate is formed coated on said second substrate;

(II) laminating together the construction and the first substrate in a manner such that the bonding material layer having a stress relaxation value of at least about 15% is in contact with at least the abraded area of the first major surface of the first substrate.

In another embodiment of a method of the invention step (c) comprises the steps of (I) providing a construction comprising
  (i) the second substrate; and
  (ii) the bonding material layer having a stress relaxation value of less than about 15% at a temperature at which the laminate is formed coated on at least a portion of the second major surface of said second substrate;
(II) causing the bonding material layer of (I) (ii) to change such that its stress relaxation value becomes at least about 15% at a temperature at which the laminate is formed;
(III) laminating together the construction and the first substrate in a manner such that the bonding material layer having a stress relaxation value of at least about 15% is in contact with at least the abraded area of the first surface of the first major surface.

In one embodiment of a method of the invention the $R_{max}$ of the first major surface of the first substrate in step (a) is at least about 40 microns.

In one embodiment of a method of the invention the $R_{max}$ of the first major surface of the first substrate in step (b) is about 25 microns or less.

In one embodiment of a method of the invention the $R_{max}$ of the first major surface of the first substrate in step (a) is at least about 40 microns to about 500 microns.

In one embodiment of a method of the invention the $R_{max}$ of the first major surface of the first substrate in step (b) is about 15 microns or less.

In one embodiment of a method of the invention the $R_{max}$ of the first major surface of the first substrate in step (a) is at least about 40 microns to about 100 microns.

In one embodiment of a method of the invention the $R_{max}$ of the first major surface of the first substrate in step (b) is about 8 microns or less.

In one embodiment of a method of the invention the maximum haze value of the first major surface of the first substrate in step (b) is at least about 30% and the maximum haze value through the laminate in step (c) is less than about 20%.

In one embodiment of a method of the invention the first substrate is a glass window.

In one embodiment of a method of the invention the first substrate and the second substrate have the same shape, width and length.

The present invention also provides a method comprising:
(a) providing a first substrate, the first substrate having a first major surface and an opposite second major surface, wherein the first substrate is selected from the group consisting of glass, plastic and combinations thereof, wherein the first substrate has at least one scratch on its first major surface and wherein the first major surface of the first substrate has an $R_{max}$ greater than about 1 micron;
(b) removing any visible contaminants on the first major surface of the first substrate by cleaning;
(c) forming a laminate comprising (i) the first substrate, (ii) a second substrate having a first major surface and an opposite second major surface, wherein the second substrate comprises immediately before, during and after formation of the laminate a material selected from the group consisting of glass, amorphous plastic in its glassy state, amorphous plastic in its rubbery state, crystalline plastic in its glassy state, crystalline plastic in its rubbery state and combinations thereof, and (iii) a bonding material layer positioned between the first substrate layer and the second substrate layer, wherein the bonding material layer is in contact with at least the abraded area of the first major surface of the first substrate and is in contact with at least a portion of the second major surface of the second substrate layer;
wherein a maximum haze value through the laminate is less than about 20 percent.

In a preferred embodiment of the article of the invention the first substrate has a Scratch Visibility Test Rating of 1–2 and the laminate has a Scratch Visibility Test Rating of 0–1.

In a preferred embodiment of the article of the invention the first substrate has a maximum haze value of about 20 or greater and the maximum haze value through the laminate article is less than about 20 percent.

In a preferred embodiment of a method of the invention the first substrate has after an abrading step a maximum haze value of about 20 or greater and the maximum haze value through the laminate article is less than about 20 percent.

The present invention also provides articles wherein the first substrate is scratched and/or abraded on both sides and bonding material and a second substrate are applied to both sides of the scratched first substrate. The final article preferably has the same haze value and scratch test values discussed elsewhere herein;

The first substrate and second substrate are typically permanently bonded to each other although the second substrate may optionally be readily removable.

BRIEF DESCRIPTION OF THE DRAWINGS

FIG. 8 shows the window before it is scratched.

FIG. 9 shows the window with scratches 206 therein.

DETAILED DESCRIPTION OF THE INVENTION

First Substrate

Figure 1:
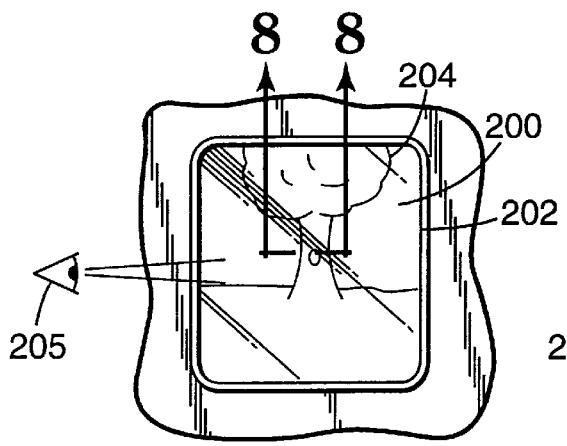
FIG. 1 illustrates a plan view of a window 200.

The first substrate should be relatively clean before application of the bonding layer and the second substrate. If it is not relatively clean, visible debris could become trapped in the final article thus interfering with the haze or visibility of a repaired scratch. The first substrate can be cleaned for example with soap and water and a brush. This may be sufficient to remove any debris, particularly debris which may be stripped in scratches. However, since debris which may be trapped in the scratches can be difficult to remove, abrasion may be necessary by itself or in addition to cleaning.

The first substrate comprises glass, plastic or combination thereof that has been damaged by scratching and/or abrading with, for example, a rock or other abrasive articles such as sandpaper, abrasive cloth, diamond earrings or tungsten-carbide tipped styli. The first substrate, except for the damaged areas, is typically transparent. The first substrate can optionally be tinted and/or contain printed images. The first substrate could, for example, be safety glass where two pieces of the glass are laminated to a polyvinyl butyral film such that the film is between the two sheets of glass. The first substrate could optionally be thermally tempered glass where the glass has been heated and rapidly cooled. The result is a stratified glass morphology where the outer surfaces of the glass are hardened by the tempering process and the center portion of the glass is under compression. Thermally tempered glass, when cut or damaged through the outer tempered layer will shatter into many pieces because the compressed inner layer is no longer under compression in the damaged area. To relieve the stress, the glass shatters. The first substrate could optionally be chemically tempered glass where to 2–10 microns of each side of the glass are hardened by a chemical process. In the case of chemically tempered glass the center layer is not under compression. If the hardened outer layer is damaged, chemically tempered glass will not shatter like thermally tempered glass. The first substrate can alternatively comprise plastics such as, for example, polycarbonate or polymethylmethacrylate based polymers.

Typically it is easier to scratch plastic than glass. Thus the scratches in damaged glass are typically not as deep as those in damaged plastic.

The scratched and/or abraded surface of the first substrate is characterized by two measurements. The first measurement is $R_{max}$, where $R_{max}$ is the maximum peak to valley height of the scratched and/or abraded surface of the first substrate. The measurement describes the depth of the scratches and/or abrasions on the surface.

The second measurement used to characterize the surface is $R_a$. $R_a$ is an indication of the variability of the surface roughness and is defined as the arithmetic mean of the departures at the roughness profile from the mean line of the surface profile. Both surface measurements are familiar to those skilled in the art and are commonly used to characterize a surface. The units of measure for $R_a$ and $R_{max}$ are typically in microns. Mathematically the terms are described as follows.

$$R_{max} = y_{max} - y_{min}$$

wherein $y_{max}$ = the highest vertical point over the profilometer assessent length.

$y_{min}$ = the lowest vertical point over the profilometer assessent length.

$$R_a = \frac{1}{L} \int_O^L |y(x)| 2x \text{ where}$$

L=The assessment length of the profilometer. During the test the profilometer head moves over the sample and has a path of typically 5 mm in the x direction. This can be adjusted on most profilometers.

y=variation of the height and depth of the profile or the vertical component of the data.

x=horizontal component of the profilometer motion as traverses across the sample. L represents the maximum x value for the measurement process.

Typically the $R_{max}$ value of a scratched glass substrate such as a window pane ranges from about 1 to about 75 microns. For plastic substrates, the damaged substrates typically have an $R_{max}$ value ranging from about 1 to about 300 microns. The tool used to measure $R_{max}$ of the damaged first substrate was a profilometer manufactured by the Mahr Corporation of Cincinnati Ohio (Model: Perthometer M4P).

The method of repair and surface preparation of the first substrate required to provide a final laminate article having the desired haze value depends on the composition of the first substrate, the cleanliness of the first substrate including damaged areas and the depth or severity of the damage. In a less complex case where the damaged first substrate is clean and the severity of the scratches is minimal (i.e. the $R_{max}$ is less than about 50 microns) then no additional surface preparation is typically required. However, frequently the scratches contain debris and need to be aggressively cleaned such as with a scrubbing pad and a soap. However, debris in some cases is most effectively removed from the damaged first substrate by an abrasion process. Several abrasive methods can be used to abrade the damaged surface of the first substrate including sand blasting, high pressure water with an abrasive grit, grinding with a flexible diamond or aluminum oxide abrasive material, etc. Care needs to taken when abrading the first substrate especially thermally tempered glass. If the outer layer is penetrated by the damage or by the abrasion process, the glass may shatter. For thermally tempered glass the depth of each of the outer tempered layers is typically 30% of the thickness of the glass. The thickness of the compression layer is typically 40% of the thickness of the glass.

The abrasion process also smoothes the topography of the scratches. The depth of the scratches is reduced and preferably the sharpness of the scratches is minimized. The preferred method for cleaning and reducing the depth of scratches is a robotic abrasion process that grinds the surface of the first substrate such as glass with a 74 to 250 micron 3M™ Flexible Diamond abrasive available from the 3M Company. With such a robotic system for example, a damaged window 50 cm×125 cm in size and scratched with scratches such that the $R_{max}$ of the window surface is 75 microns can be completely abraded in 8–15 minutes depending on the type of glass being abraded. The cleaning and/or abrading process of substrates comprising plastic are similar to glass substrates. In the simplest case where the scratch is clean and not severe (where $R_{max}$ is less than about 50 microns) then no surface preparation is required. The difference between surface preparation between a glass substrate and plastic substrate is typically in the type of abrasive used. Typically aluminum oxide abrasive materials are used on plastic substrates and the time required to abrade the substrate is typically less than for glass.

The damage of the first substrate in some situations may not be restricted to one surface of the substrate. It is possible for the first substrate to be damaged on both the front and back surface. An example is a glass or plastic bus shelter where passengers wait for the arrival of the bus. It is common to observe scratching on both surfaces of the plastic or glass that comprise the bus shelter. In such a circumstance to provide the desired maximum haze or desired visibility of a repaired scratch to a final laminate article one would need to optionally clean and optionally abrade each first substrate surface, followed by applications of a bonding material and second substrate. The desired haze or visibility of a repaired scratch values, etc. of the repaired structure should be the same if only one surface was repaired.

Second Substrate

The second substrate comprises glass; an amorphous and/or crystalline plastic material in its rubbery and/or glassy state immediately prior, during and after lamination to the first substrate; or a combination thereof. Examples of useful second substrates include, for example, glass panes, pre-made plastic films and combinations thereof such as safety glass. The second substrate useful herein typically has substantially the same (preferably the same) breadth, length, and width immediately before, during, and after it is applied to the first substrate. For example, a gel or liquid would not be considered to have the same breadth, length, and width immediately before and after application to a substrate.

The purpose of the second substrate is to act as a support for the bonding layer and to provide a new undamaged surface in place of the damaged first substrate. The second substrate provides protection in addition to enhancing the strength and shatter resistance of the first substrate. The second substrate is typically transparent which means that it does not typically detract from the observer's ability to distinguish images therethrough. The second substrate can optionally be tinted or contain printed images in a manner in which does not impact the observer's ability to distinguish or read images through at least a portion, preferably a major portion, and most preferably all of the second substrate. The second substrate is not applied as a gel or a flowable liquid but as glass and/or as an amorphous and/or crystalline plastic in its rubbery or glassy state (preferably glassy) immediately prior, during, and after application. The "solid" nature of the second substrate makes application of the second substrate much easier to the first substrate than would be the spraying or coating a liquid or a gel. The uniformity of the second substrate used herein (which is typically a pre-made plastic film or glass pane) is far superior to that which could be obtained by application of a liquid or gel which must later cure or set in place. Uniformity of the second substrate is helpful in providing a final laminate article with the desired optical properties (such as haze or visibility of a repaired scratch). Another advantage of having a second substrate that is not a liquid or gel is that the thickness of the second substrate can be accurately defined in advance of the application. The thickness can be important where the second substrate offers protection and enhances the safety of the first substrate.

Typically a second substrate which comprises a polymeric material has a tensile strength as measured according to ASTM D882 of about 20 to about 2000 kPa, preferably about 70 to about 1400 kPa, and most preferably about 350 to about 100 kPa.

Typically a second substrate which comprises a polymeric material has an elongation as measured according to ASTM D882 of about 5 to about 1000 percent, preferably about 5 to about 500 percent, and most preferably about 350 to about 1000 percent.

Typically a second substrate which comprises a polymeric material has a tear strength as measured according to ASTM D1004 of about 0.4 to about 40 N, preferably about 4 to about 20 N, and most preferably about 12 to about 20 N.

Typically a second substrate which comprises a polymeric material has a thickness of about 25 to about 4000 microns, preferably about 50 to about 1000 microns, and most preferably about 50 to about 250 microns.

For a non-polymeric second substrate such as glass, for example, the thickness typically ranges from about 1 mm to about 10 mm, preferably about 2 mm to about 7 mm.

Depending on the application, the second substrate may need to resist a wide variety of environmental conditions including prolonged exposure to high temperatures, high humidity or ultraviolet light. The second substrate may, for example, comprise a polymer including but not limited to those selected from the following broad classifications of materials: polyesters, polycarbonates, acrylics, polymethacrylates, polyurethanes, urethane acrylate polymers, epoxy acrylate polymers, polyacetals, polystyrene, polyvinyl chloride, and polyolefins such as ethylene vinyl acetate copolymers, polyethylene, polypropylene, ionomers of ethylene, and mixtures thereof. The second substrate may comprise, for example, a blend of the materials listed above or multilayer structures of the materials listed.

The second substrate may optionally further comprise additives such as, for example, flame retardants, ultraviolet light absorbers, antioxidants, and hindered amine stabilizers, and combinations thereof The second substrate may optionally further comprise an abrasion resistant coating on the surface that is not in contact with the bonding layer. Multifunctional acrylate or methacrylate abrasion resistant coatings are described in U.S. Pat. No. 5,633,049, issued on May 27, 1997.

The second substrate may optionally be primed to enhance the adhesion of the bonding layer thereto. The primes may include, for example, surface treatments such as corona treatments or flame treatments or may include, for example, coatings such as acrylics, polyvinyl chloride, polyvinyl chloride/polyvinyl acetate copolymers, polyesters, urethanes, polyamides, and chlorinated olefins or maleic anhydride modified olefins.

Bonding Material

The bonding material is preferably transparent and preferably flows into the scratches and/or abraded areas of the damaged first substrate which aids in preparation of the final article with the desired maximum haze value or visibility of repaired scratch value. As the haze is improved, the transparency of the article is improved. The bonding material may, for example, be a solid, semi-solid or liquid. The bonding material is preferably a poly(acrylate) or (methacrylate), polyolefin or rubber based pressure sensitive adhesive that has a stress relaxation value of about 15 percent or greater. Stress relaxation is a property that is indicative of the viscoelastic flow of the material. Stress relaxation is measured as described in the Test Methods. Bonding materials with little or no flow properties relax only 0 to less than about 15% of the applied stress. Bonding materials which are useful in this invention preferably have the viscoelastic flow properties needed for flowing into the abraded and/or scratched surface of the first substrate. They preferably stress relax from greater than about 15 to 100% of the applied stress. Stress relaxation values are temperature sensitive. The value for stress relaxation are values obtained when stress relaxation is measured at about 23° and about 50% relative humidity.

The thickness of the bonding material is very important, as the $R_{max}$ of the scratches increases, the bonding layer thickness preferably increases so enough mass of the bonding layer is available to flow into the damaged areas of the first substrate. The thickness of the coated bonding layer also depends on the amount of flow exhibited by the bonding layer. A bonding layer made of a flowable viscous liquid preferably should be coated at a thickness less than the deepest scratch while bonding layers made of polymers that have less viscoelastic flow preferably should be coated at a thickness greater than the scratch requiring repair.

The refractive index of the bonding layer may be important when repairing deep scratches. To minimize the visibility of a repaired scratch, matching the index of refraction (i.e. typically within about 0.05 more preferably exactly the same) of the bonding layer to the index of refraction on the first substrate is preferred especially if the $R_{max}$ of the first substrate is greater than 50 microns. The closer the match in refractive index, the typically less visible the repaired scratch. On first substrates where the $R_{max}$ is less than 25 microns the matching the refractive index of the first substrate with the bonding layer is less important.

The bonding material can optionally further comprise one or more additives including but not limited to those selected from the group consisting of flame retardants, ultraviolet light absorbers, antioxidants, and hindered amine stabilizers. The bonding layer is preferably laminated to a release liner to protect the bonding layer surface from handling damage or dirt pick up.

To facilitate application of a bonding material coated second substrate to the abraded and/or scratched first substrate a water/alcohol or water/detergent mixture may be used, for example. An example thereof is a 25 percent by weight isopropanol water solution. Such a mixture is typically applied with a spray bottle to the scratched and/or abraded substrate. The release liner protecting the bonding layer of the bonding material coated substrate is removed and the bonding material is also sprayed with such a mixture. The wet bonding material layer surface and the wet first substrate surface are brought into contact. The excess solution is removed from the interface with a squeegee or a roller such that no trapped air or excess solution is left at the interface of the first substrate and the bonding material. A solution of 0.1% to 1% by weight liquid detergent in water based on the total weight of the detergent/water solution is also useful as an aid for application.

The bonding layer can alternatively be applied by first forming a laminate comprising the second substrate, the bonding layer coated on one surface thereof, and a non-tacky coating coated over the bonding layer. The bonding layer may, for example, comprise a pressure-sensitive adhesive. For example, a pressure sensitive adhesive may be applied to one side of the second substrate, coated with a thin non-tacky coating and dried. This non-tacky surface prevents the bonding layer inadvertently adhering to a surface prior to use. This non-tacky surface upon subsequent conversion to a tacky surface would later be positioned against the first substrate.

The non-tacky coating allows large sections of the second substrate to be more easily applied to a first substrate in environments (such as a bus, for example) where there is an abundance of debris such as dust and dirt, without as much concern for the debris collecting on the tacky bonding material.

An example of a useful non-tacky material for this purpose is a water-soluble cellulose based non-tacky material such as Methocel™ A15-LV methocellulose from Dow Chemical of Midland, Mich. Such a material is typically coated such that the dry thickness is about 1 to about 5 microns. Water is typically used to convert the non-tacky coating to a tacky coating although a water/detergent and/or a water/alcohol solution may also be used. Such a spray is typically also used on the first substrate to facilitate application of the second substrate and bonding layer. For example, water may be sprayed on the cellulose based surface coating and on the first substrate prior to lamination of the cellulosic surface to the first substrate surface. The trapped water is removed from the first substrate/water soluble coating interface using a squeegee or roller. The thin soluble coating is dissolved during the process exposing the pressure sensitive adhesive to the first substrate. In this case the pressure sensitive adhesive layer has a high degree of viscoelastic flow and the cellulose based coating in the water saturated state has a high degree of viscoelastic flow. When the water evaporates the cellulose based coating and the pressure sensitive adhesive typically have filled the voids in the scratched and/or abraded first substrate and the remaining cellulose based layer becomes rigid. The pressure sensitive adhesive bonds to the first substrate in regions where the cellulose based coating has been completely dissolved.

The bonding material may optionally be in the state of a viscous liquid. The viscous liquid is preferably 100% solids so no solvent evaporation is required. The viscous liquid is preferably transparent. The viscous liquid typically comprises acrylate monomers such as those selected from the group consisting of acrylates, methacrylates, urethane acrylates or epoxy acrylates, and a photoinitiator(s) required to activate polymerization by radiation such as UV or visible light. The viscous liquid can be coated onto the second substrate and laminated to the first substrate using a squeegee and roller to eliminate any trapped air at the interface. The viscous liquid could also be applied directly to the damaged first substrate. The second substrate is applied to the first substrate coated with the viscous liquid. Any trapped air is removed with a squeegee or a roller. The viscous solution is subsequently cured. This embodiment is very useful at repairing severely damaged first substrates with deep scratches and where repair time is a critical factor.

Release Liner

Preferably a release liner protects the surface of the bonding layer not in contact with the second substrate. Preferably the release liner imparts no texture to the bonding layer, shields the bonding layer from contamination from debris, and is easily released from the bonding layer prior to application. Useful release liners include, for example, polyester or polyolefin films. These films may be coated with silicone or fluorinated release surfaces to facilitate release from the bonding layer. For added dimensional stability, the release liner may comprise a film and paper laminate provided the paper imparts no texture or a texture that does not detract from the transparency of the bonding layer.

The invention will be better understood by referring to the following figures.

FIG. 1 illustrates a plan view of a window 200. A rim 202 extends around the window 200. An observer 205 views a tree 204 through the window 200.

Figure 2:
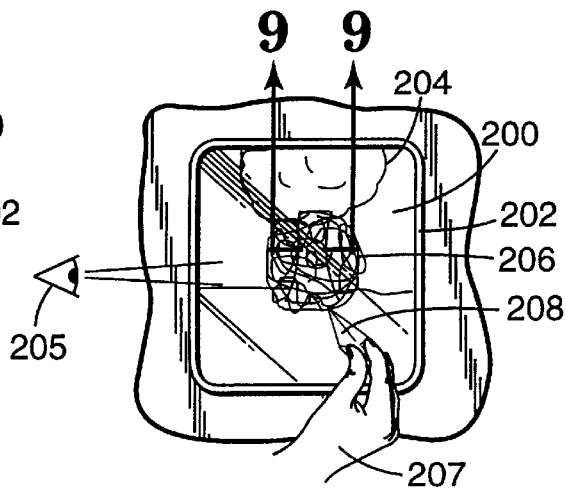
FIG. 2 illustrates a plan view of the same window 200 as in FIG. 1 except that it shows a vandal 207 scratching the window 200 with a rock 208.

FIG. 2 illustrates a plan view of the same window 200 as in FIG. 1 except that it shows a vandal 207 scratching the window 200 with a rock 208. The tree 204 can no longer be clearly viewed through the window 200.

Figure 3:
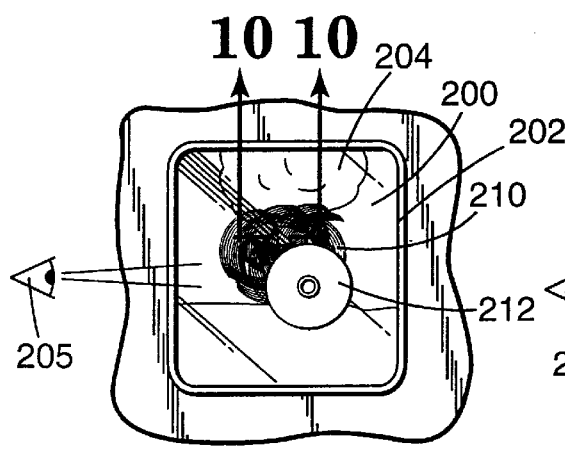
FIG. 3 illustrates a plan view of the same window 200 as in FIG. 2 except that the window 200 has been abraded with an abrasive disk 212 over the scratches.

FIG. 3 illustrates a plan view of the same window 200 as in FIG. 2 except that the window 200 has been abraded with an abrasive disk 212 over the scratches. Typically the abrasive disk 212 would be a part of a grinder held by an operator. Neither the grinder nor operator are shown, however.

Figure 4:
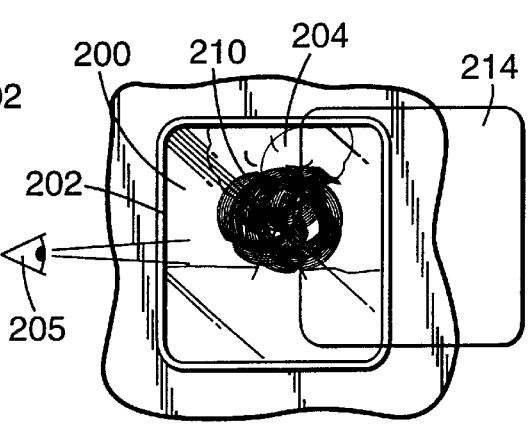
FIG. 4 illustrates a plan view of the same window of FIG. 3 wherein a coated substrate 214 is being moved into position for placement onto the window 200.

FIG. 4 illustrates a plan view of the same window of FIG. 3 wherein a coated substrate 214 is being moved into position for placement onto the window 200.

Figure 5:
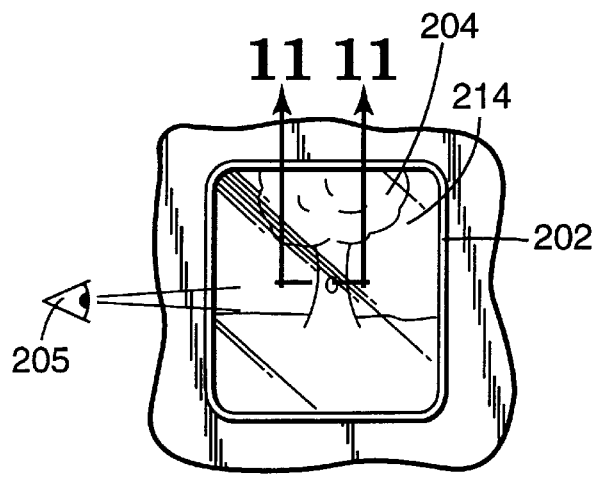
FIG. 5 illustrates a plan view of the window of FIG. 4 wherein the coated substrate 214 has been positioned into place thus rendering the window 200 clear enough so that the tree 204 can be viewed therethrough.

FIG. 5 illustrates a plan view of the window of FIG. 4 wherein the coated substrate 214 has been positioned into place thus rendering the window 200 clear enough so that the tree 204 can be viewed therethrough.

Figure 6:
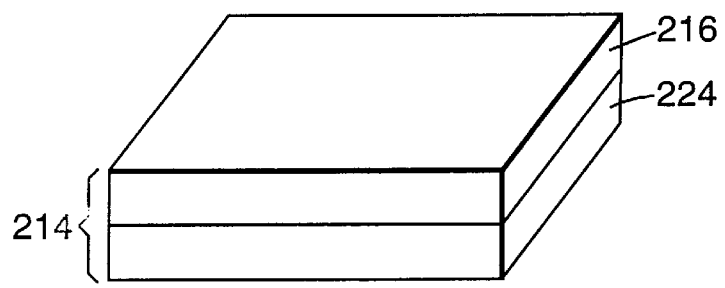
FIG. 6 is a perspective view of the coated film 214 which is shown in FIGS. 4 and 5. The coated film comprises a plastic film second substrate 216 and a bonding material layer 224.

FIG. 6 is a perspective view of the coated film 214 which is shown in FIGS. 4 and 5. The coated film comprises a plastic film second substrate 216 and a bonding material layer 224.

Figure 7:
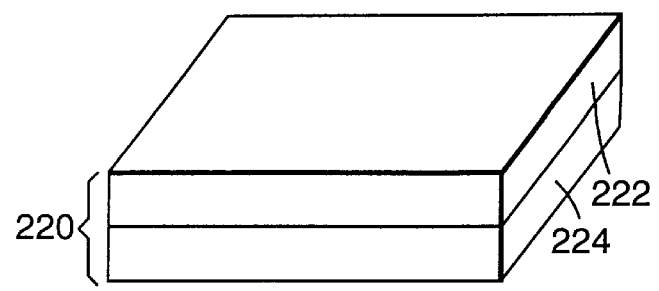
FIG. 7 is a perspective view another embodiment of the coated film of Example 6.

FIG. 7 is a perspective view another embodiment of the coated film of Example 6. The coated substrate comprises a glass sheet second substrate 222 and bonding material layer 224.

Figure 8:
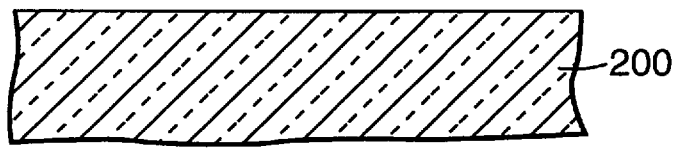
FIG. 8 is a cross-sectional view taken along line 8—8 on FIG. 1.

FIG. 8 is a cross-sectional view taken along line 8—8 on FIG. 1. FIG. 8 shows the window before it is scratched.

Figure 9:
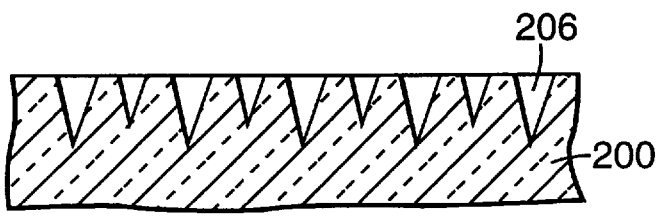
FIG. 9 is a cross-sectional view taken along line 9—9 on FIG. 2.

FIG. 9 is a cross-sectional view taken along line 9—9 on FIG. 2. FIG. 9 shows the window with scratches 206 therein.

Figure 10:
FIG. 10 is a cross-sectional view taken along line 10—10 on FIG. 3.

FIG. 10 is a cross-sectional view taken along line 10—10 on FIG. 3. FIG. 10 shows the window after grinding in which the scratches 206 are now of lesser depth due to the grinding operation.

Figure 11:
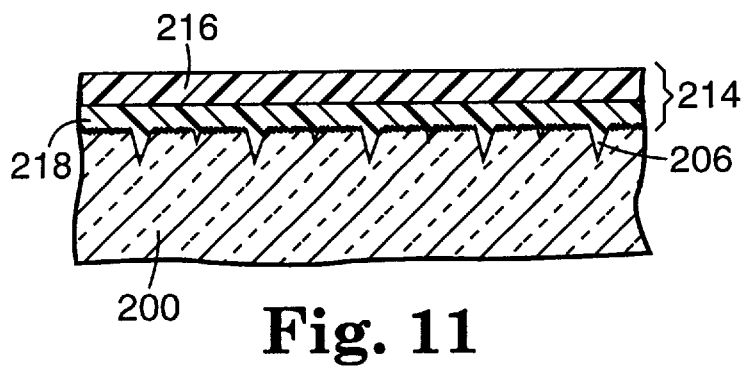
FIG. 11 is a cross-sectional view taken along line 11—11 on FIG. 5.

FIG. 11 is a cross-sectional view taken along line 11—11 on FIG. 5. The bonding layer 218 and second substrate 216 are bonded to the glass. The bonding layer 218 has flown into the scratches 206.

Figure 12:
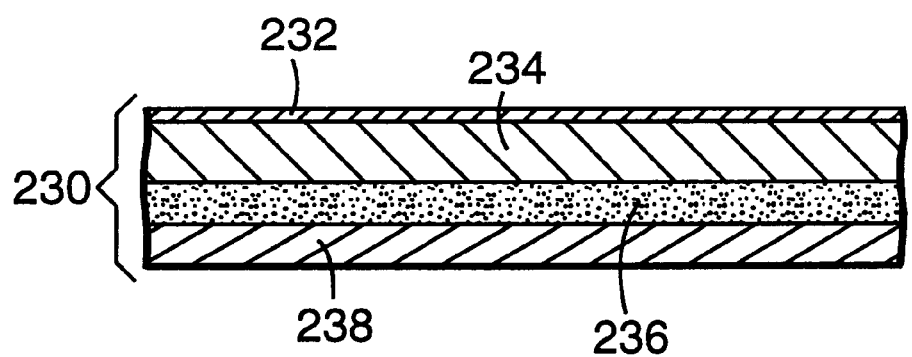
FIG. 12 is a cross-sectional view of a coated film embodiment 230.

FIG. 12 is a cross-sectional view of the coated film 230. The coated film comprises a hard coat (release layer) 232, a plastic film second substrate, a bonding layer 236 and a plastic release liner 238.

Figure 13:
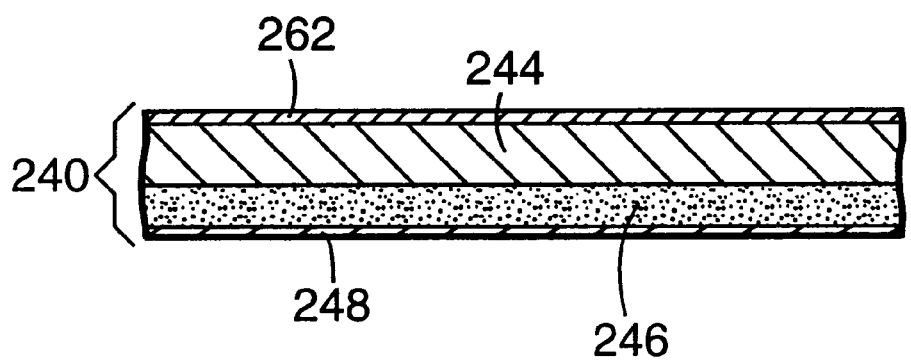
FIG. 13 is a cross-sectional view of a coated film embodiment 240.

FIG. 13 is a cross-sectional view of the coated film 240. The coated film comprises a hard coat (release layer) 262, a plastic film second substrate 244, a bonding layer 246, and a water soluble detackification layer 246.

Test Methods
Effect of Sample on Visual Acuity of Observer

An observer with 6 meter/6 meter vision is positioned 3 meters from a 3 Meter Snellen eye chart, covers one eye and reads with the uncovered eye the line which corresponds to 6 meter/6 meter vision. (An observer with vision corrected to 6 meter/6 meter vision is considered to have 6 meter/6 meter vision as long as the corrective lenses are worn during the test.) A sample of the article or material to be evaluated is then placed 3 centimeters in front of the observer's uncovered eye while the other eye remains covered to determine if the sample causes a loss of visual acuity. If the viewer can still read the line of letters indicative of 6 meter/6 meter vision it is considered that there is no interference with visual acuity caused by the sample. If the line indicative of 6 meter/6 meter vision cannot still be read the smallest line which can still be read is recorded. (For example 6 meter/9 meter, 6 meter/12 meter, 6 meter/15 meter, 6 meter/18 meter, etc.)

Preferably with respect to an article of the invention the answer can read a line indictive of 6 meter/i 8 meter vision or better, preferably 6 meter/i 5 meter vision or better, more preferably 6 meter/12 meter vision or better, even more preferably 6 meter/6 meter or better, and most preferably 6 meter/6 meter or better.

Stress Relaxation of the Bonding Layer

The sample preparation techniques for measuring stress relaxation is slightly different depending on the embodiment of the invention being evaluated. The specific procedures and test methods are outlined below for each embodiment. The percent stress relaxation in each case is calculated as follows (wherein the loads are in the same units). Typically the bonding layer useful according to the present invention, regardless of the embodiment, exhibits a stress relaxation of greater than about 15 percent preferably greater than about 20 percent, and most preferably greater than about 25 percent.

Percent Stress Relaxation=(initial load−load after 120 sec)×100/initial load

Stress Relaxation Test Procedure Used When the Bonding Layer is Inherently Tacky The bonding material to be evaluated is coated on a non-extensible backing film (such as a polyester film with a minimum thickness of 100 microns, for example) to a dried thickness of at least 25.4 microns. A variety of coating methods may be used. The coating needs to be applied such that the surface of the coating is free from dirt and smooth. The coated film is cut into a 25 mm×150 mm strip.

A 50 mm×150 mm #6 stainless steel test panel is cleaned with toluene and dried. The coated film is applied via its coating side to the steel panel such that a 25 mm×25 mm area of the coated film is in contact with the panel and the remaining portion of the coated film hangs over the edge of the panel. Thumb pressure is used to apply the coated film to the panel. The interface between the coated film and the panel is free of trapped air bubbles and the coated film and the panel are in intimate contact. The panel with the coated film applied thereto is mounted in a tensile testing device (such as an Instron Model # 5565 from the Instron Corporation of Houston Tex.) in its bottom jaw while the overhang portion of the coated film is held in its upper jaw. A shear load of 4.5 kg (i.e. the initial load) is applied to the panel with the coated film applied thereto with a jaw speed of 2.54 cm/sec. The fraction of the remaining load on the sample after a 120-second time interval is recorded. The test is conducted at about 23° C. and about 50% Relative Humidity (R.H.), but could be conducted at other temperatures such as the use temperature or at a temperature range of 0–25° C., if desired.

Stress Relaxation Procedure Used When the Bonding Layer is Coated with a Water Soluble Detackifying Layer The test panel procedure begins by cleaning the 50 mm×150 mm #6 stainless steel panel with toluene and allowing the panel to dry. Apply approximately 5 g of water on the panel directly in the 25 mm×25 mm location of the coated film to be tested. Apply the coated film onto the wet test panel such that a 25 mm×25 mm area of the coated film is in contact with the test panel and the remaining portion of the coated film hangs over the edge of the panel. With a roller, squeegee or thumb pressure, remove the excess water from the interface. After 72 hours at about 23° C. and about 50% R.H., conduct the stress relaxation test. The panel with the coated film applied thereto is mounted in a tensile testing device (such as an Instron Model # 5565 from the Instron Corporation of Houston Tex.) in its bottom jaw while the overhang portion of the coated film is held in its upper jaw. A shear load of 4.5 kg (i.e. the initial load) is applied to the panel with the coated film applied thereto with a jaw speed of 2.54 cm/sec. The fraction of the remaining load on the sample after a 120-second time interval is recorded. The test was conducted at about 23° C. and about 50% R.H., but could be conducted at other temperatures such as the use temperature or at a temperature range of 0–25° C., if desired.

Stress Relaxation Procedure Used When Bonding Layer is Comprised of a Reactive Liquid The 50 mm×150 mm #6 stainless steel panel is cleaned with toluene and allowed to dry. The unreacted bonding material is coated on a non-extensible backing preferably a transparent corona treated polyester film greater than 50 micron in thickness. The size of the coated sheet is 25 mm×150 mm. The coated film is applied to the panel with the coating of liquid bonding layer in contact with the panel such that a 25 mm×25 mm area of coated film is in contact with the panel. The remaining portion of the strip hangs over the edge of the panel. The coating is cured. Curing may be accomplished with UV light or by a thermal process depending on the chemistry of the coating. The stress relaxation is measured when the coating is cured. The panel with the coated film applied thereto is mounted in a tensile testing device (such as an Instron Model # 5565 from the Instron Corporation of Houston Texas) in its bottom jaw while the overhang portion of the coated film is held in its upper jaw. A shear load of 4.5 kg (i.e. the initial load) is applied to the panel with the coated film applied thereto with a jaw speed of 2.54 cm/sec. The fraction of the remaining load on the sample after a 120-second time interval is recorded. The test was conducted as about 23° C. and about 50% R.H., but could be conducted at other temperatures such as the use temperature or at a temperature range of 0–25° C., if desired.

Haze Test

The haze of a sample is measured by using a Gardner XL211 Hazeguard device.

The procedure used is in accordance to ASTM D1003-95 with the following exceptions
1. The sample size is rectangular with a minimum size of 40 mm×40 mm.
2. The sample is scanned for areas of the maximum haze. These selected areas are measured and the maximum haze value is reported.
3. The sample is allowed to equilibrate at about 23° C. and about 50% R.H. for 72 hours prior to testing.

180 Degree Peel Adhesion to Glass-Procedure Used When the Bonding Layer is Inherently Tacky A 100 mm×200 mm flat glass plate is cleaned with toluene and allowed to air dry prior to application of the material (a second substrate with a bonding layer) to be tested. The adhesion to glass is measured by bonding a 25 mm×150 mm of the material to be tested using a rubber roller such that no trapped air exists at the glass bonding layer interface and a 25 mm×50 mm of the material being tested is hanging over the edge of the glass plate. The material being tested is allowed to dwell on the glass at least 10 minutes. The glass plate is clamped onto the carriage of a Slip-Peel Tester Model SP102C-3090 adhesion tester (IMASS Inc., Accord Mass.). The overhang of the sheet is clamped to a sensor of the tester. As the carriage moves, the force to peel the sheet is measured at 228.6 cm/min at an angle of 180 degrees. The average force over a 2 second period is recorded. The test is conducted at about 23° C. and about 50% R.H.

The glass panel is inspected for residue (such as adhesive residue) left after peel. Preferably substantially no residue remains on the glass. Most preferably no residue remains on the glass.

180 Degree Peel Adhesion to Glass-Procedure Used When the Bonding Layer is Coated With a Water-Soluble Detackifying Layer A 100 mm×200 mm flat glass plate is cleaned with toluene and allowed to air dry prior to application of the material (a second substrate/bonding layer/water soluble detackifying layer laminate) to be tested. A 0.5% Joy™ dishwashing detergent 99.5% water solution is applied over the glass surface. The adhesion to glass is measured by bonding a 25 mm×150 mm of the material to be tested to the glass such that the detackifying layer is in contact with the detergent and water coated glass. A rubber roller is used such that no large bubbles of water are present under the material. A 25 mm×50 mm section of the material being tested hangs over the edge of the glass plate. The material being tested is allowed to dwell on the glass for 72 hours at about 23 degree C and 50% R.H. The glass plate is clamped onto the carriage of a Slip-Peel Tester Model SP-102C-3090 adhesion tester (IMASS Inc., Accord Mass.). The overhang of the sheet is clamped to a sensor of the tester. As the carriage moves, the force to peel the sheet is measured at 228.6 cm/min at an angle of 180 degrees. The average force over a 2 second period is recorded. The test is conducted at about 23° C. and about 50% R.H.

The glass panel is inspected for residue (such as adhesive residue) left after peel. Preferably substantially no residue remains on the glass. Most preferably no residue remains on the glass.

180 Degree Peel Adhesion to Glass-Procedure Used When the Bonding Layer is a Reactive Liquid A 100 mm×200 mm flat glass plate is cleaned with toluene and allowed to air dry prior to application of the material (a second substrate with a reactive liquid bonding layer) to be tested. The adhesion to glass is measured by bonding a 25 mm×150 mm of the material to be tested such that the bonding material is in contact with the glass using a rubber roller such that no air bubbles are present under the material and a 25 mm×50 mm section of the material being tested is hanging over the edge of the glass plate. The bonding material is cured. The bonding material can be accomplished with UV light or by a thermal process depending on the chemistry of the coating. The glass plate is clamped onto the carriage of a Slip-Peel Tester Model SP-102C-3090 adhesion tester (IMASS Inc., Accord Mass.). The overhang of the sheet is clamped to a sensor of the tester. As the carriage moves, the force to peel the sheet is measured at 228.6 cm/min at an angle of 180 degrees. The average force over a 2 second period is recorded. The test is conducted at about 23° C. and about 50% R.H.

The glass panel is inspected for residue (such as adhesive residue) left after peel. Preferably substantially no adhesive residue remains on the glass. Most preferably no adhesive residue remains on the glass.

Scratch Visibility Test

The sample to be evaluated is placed at a 45° angle over a black substrate in a McBeth light booth (Model No. STLA available from the McBeth Corporation, Newborough, N.Y.) and viewed at a distance of 3 meters under daylight lamp settings by an observer with vision of 6 meter/6 meter or vision corrected to 6 meter/6 meter. The sample is rated for the visibility of scratch(es). The most visible scratch in sample is examined and used to rate the sample. A rating of 0 indicates that no scratch(es) are visible in the sample. A rating of 1 indicates the scratch(es) be seen with great difficulty. A rating of 2 indicates the scratch(es) in the sample can be seen without difficulty. This test can be performed for example on a singe scratched substrate or a laminate article such as the article of the invention. When one compares the article of the invention itself to the first scratched substrate one should preferably see a reduction in the test value of at least 1. A scratched first substrate typically has a rating of 1–2. An article of the invention preferably has a test value of 0–1 more preferably 0. To test a single layer of a preformed laminate such as the first substrate for scratches, one could take apart the laminate and clean the bonding material from the substrate to test the single scratched first substrate.

EXAMPLES

All the test methods referred to in the Examples were carried out as described in the "Test Methods" section above. All parts, percentages, ratios etc in the example are by weight unless indicated otherwise.

Example 1

A 30 cm×30 cm piece of laminated safety glass from Hillcrest Glass in Minneapolis, Minn. was scratched with a carbide tipped scribe from General Tools Manufacturing Company Inc. New York, N.Y. Four scratches were made in the safety glass on one side thereof. The scratches, which were each approximately straight and each approximately 25 cm long were positioned approximately parallel to each other at spacing of approximately 1.25 cm. The $R_{max}$ of the scratched surface ranged from 16–49 microns. A rotary grinder with a water center feed using a 125-micron flexible diamond abrasive disk under the tradename 3M™ Flexible Diamond Products from 3M Company in St. Paul, Minn. was used to grind down the area over and surrounding the scratches. The speed of the rotary grinder was 2400 rpm. The abrasive disk was 12.7 cm in diameter. The pressure applied to the abrasive disk was 160 Newtons and the abrasive disk was held at a 4 degree angle to the horizontal. The abraded surface of the glass was characterized using a profilometer manufactured by the Mahr Corporation of Cincinnati, Ohio (Model: Perthometer M4P). The $R_{max}$ and $R_a$ of the abraded surface were measured. The $R_{max}$ or the maximum peak to valley height in the abraded region was measured in the range of 6–13 microns. The $R_a$ of the abraded area or the arithmetic mean of the departures of the roughness profile from the mean line was measured to be 0.60–0.71 microns using the profilometer.

A bonding material solution comprising 96 parts by weight of isooctyl acrylate and 4 parts by weight of acrylamide was prepared in a 50% heptane/50% ethyl acetate solution using 2,2'-azobis(isobutyronitrile) free radical initiator available under the trademark designation "VAZO™ 64" from the E.I. DuPont Company.

The following components were added to a reaction vessel: 19.2 kg of isooctyl acrylate, 0.8 kg of acrylamide, 40 kg of heptane and 40 kg of ethyl acetate. While constantly stirring under a nitrogen atmosphere and controlling the temperature between 70–100° C., 270 grams of VAZO™ 64 was added to the vessel in three 90-gram increments. The resulting polymer had a conversion of 98%. The Brookfield viscosity was measured (#3 spindle at 12 rpm) at 2000–2800 cps at a solids level of 19–23%. The inherent viscosity of the polymer was 1.25–1.40 dl/gram.

A second substrate with a bonding layer coated on one side thereof was prepared by coating the bonding material solution described above on a 15 cm×100 cm×125 micron thick optically clear biaxially oriented corona treated polyester film using a knife coater at a wet thickness of 175 microns. The sample was dried in an air convection oven for 10 minutes at 82° C. The dry thickness of the coating on the coated substrate was 20–25 microns. The tacky bonding layer of this coated substrate was protected by laminating an optically clear silicone coated polyester film to the tacky bonding layer. The linear used was 1–2 PESTRD (P1)-7200 from DCP Lohja Inc. of Lohja Calif.

An appropriate size piece of the second substrate coated with bonding layer and protective silicone coated polyester film was cut out in order to test the stress relaxation of the bonding material. The silicone coated protective film was removed. The stress relaxation of the bonding layer was measured to be 65% using the "Stress Relaxation Test Procedure for Inherently Tacky Bonding Layers".

The haze of the abraded glass through the abraded region was measured. The haze of the abraded glass ranged from 60–65%. A 50 mm×50 mm sample of the bonding material coated on the polyester film was applied onto the abraded glass surface, after removing the protective silicone coated protective film, using a 0.5% Joy™ dishwashing detergent available from Procter and Gamble, Cincinnati, Ohio/99.5% water solution at the interface between the polyester second substrate coated with the bonding layer and the glass. The polyester second substrate coated with the bonding layer was placed coated side down on the glass. The extra solution was pressed out of the interface between the coated film and the glass with a squeegee. The second substrate and the bonding layer were allowed to dwell for 72 hours and the haze through the polyester/bonding layer/glass laminate assembly was measured to be 4.8%.

An appropriate size piece of the second substrate coated with bonding layer and protective silicone coated polyester film was cut in order to test the 180° peel adhesion to glass using the "180° Peel Adhesion to Glass-Procedure for Inherently Tacky Binding Layers." The silicone coated protective film was removed. The 180 Degree Peel Adhesion to glass of the coated polyester was 950 g/2.54 cm wide sample and no residue was observed upon removal. Visual acuity was measured through the polyester/bonding material/glass laminate assembly at 6 meter/6 meter.

This "Scratch Visibility" was measured at 2.

Example 2

Example 1 was replicated except that the second substrate/bonding material combination was applied to the abraded glass panel without using the dishwashing detergent and water interface. The second substrate bonding layer combination was applied to the abraded area of the same abraded piece of safety glass as in Example 1 but not on top of the second substrate/bonding layer combination of Example 1. This was possible due to the fact that the abraded area of the piece of glass was much larger than the substrate/bonding layer combination for both Examples 1 and 2. The second substrate and bonding layer combination was allowed to dwell on the glass for 72 hours and the resulting haze was measured to be 4.4%. The Visual Acuity was measured at 6 meter/6 meter. The 180° peel adhesion to glass using "180° Peel Adhesion to Glass-Procedure used when Bonding Layer is Inherently Tacky" was 950 g/2.54 cm and no residue was observed on the panel. The stress relaxation of the bonding material was evaluated by providing an appropriate sized piece of bonding material/second substrate combination. The stress relaxation was measured at 65% using the test "Stress Relaxation Test Procedure Used When Bonding Layer is Inherently Tacky".

Example 3

A scratched polycarbonate sheet approximately 300 mm×600 mm×13 mm with scratch depths up to 250 microns was provided. The numerous scratches which were random in direction and length covered most of one side of the window. The scratched polycarbonate sheet was abraded to a uniform textured surface. The grinder used was a Flex™ LW 603VR with a center water feed distributed by Braxton-Bragg Corp. Knoxville Tenn. The backup pad was a 3M™

Stick-It™ Disc Pad CWF (approximately 12.7mm in diameter). The surface was prepared by a three step abrasion process. The deep scratches were removed by using a 3M™ Imperial™ Microinishing Film—100 micron grade. The grinder speed was approximately 2200 revolutions per minute. The pressure of the grinder was manual pressure ranging from 1–40 Newtons. The angle of the grinder pad to the polycarbonate substrate varied from parallel to 10 degrees off the parallel. The surface of the polycarbonate sheet was kept saturated with water to reduce friction and to minimize dust. The second step was conducted dry using a 60 micron grade of 3M™ Imperial™ Microfinishing film using the speed, pressure and angle in the first step. The third step was conducted dry using a 40 micron grade of 3M™ Imperial™ Microfinishing film using the speed, pressure and angle in the first step. The surface roughness of the abraded polycarbonate was characterized by an $R_{max}$ of 1.4–7.5 microns and an $R_a$ of 0.16–1.1 microns. The haze of the abraded polycarbonate was 65–82%. A second substrate with a bonding layer coated thereon as described in Example 1 was applied to the abraded polycarbonate using the procedure outlined in Example 1. The second substrate/bonding layer sample was allowed to dwell on the polycarbonate for 72 hours and the haze measured through the second substrate/bonding layer/polycarbonate laminate was measured to be 8.5%.

Example 4

A second substrate coated with bonding material which was covered with a protective silicone coated polyester film as described in Example 1 was prepared. The protective release liner was removed and the bonding surface was coated with a water-soluble cellulosic coating using a knife coater. The formulation of the cellulosic coating was 1.6 parts by weight Methocel™ (A15 LV) methocellulose from the Dow Chemical Co. of Midland, Mich. and 98.4 parts by weight of distilled water. The methocellulose was dissolved in the water such that the viscosity of the solution was 15 centipoise using a Brookfield viscometer with a #1 spindle at a rotation rate of 60 rpm. The wet thickness of the coating was 25 microns and the dry thickness of the coating was 5 microns. The film with the cellulosic treated bonding layer was applied to the same abraded safety glass from Example 1 (in an area where no other second substrate/bonding material combinations had been bonded) with the dishwashing detergent and water technique described in Example 1. After a 72 hour dwell on the abraded glass panel, the haze was measured to be 4.4%. The stress relaxation of the bonding material was measured at 65% following the test "Stress Relaxation Procedure Used When the Bonding Layer is Coated with a Water Soluable Detackifying Layer". The Visual Acuity through the second substrate/bonding layer/glass laminate was measured at 6 meter/6 meter.

The 180° peel adhesion to glass of the second substrate/bonding layer combination was determined following be procedure given in the Test Methods except that the sample was allowed to dwell at room temperature for 72 hours prior to testing. The 180° peel adhesion to glass was measured using the "180 Degree Peel Adhesion to Glass-Procedure Used When the Bonding Layer is Coated with a Water-Soluable Detackifying Layer." The values ranged from 580–1650g/2.54 cm wide sample (areas that were moist had lower adhesion). No residue was observed on the glass after removal.

Example 5

A polymer solution to be used in making a bonding material comprising isooctyl acrylate and acrylic acid in a 90/10 ratio by weight was prepared in ethyl acetate using benzoyl peroxide as a thermal initiator. The following components were added to a reaction vessel: 18.0 kg of isooctyl acrylate, 2.0 kg of acrylamide, and 80 kg of ethyl acetate. While constantly stirring under a nitrogen atmosphere and controlling the temperature between 70–100° C., 45 grams of benzoyl peroxide was added to vessel in three 15 gram increments every 2 hours. The resulting polymer had a conversion of 95%. The Brookfield viscosity was measured (#3 spindle at 12 rpm) at 6000 cps at a solids level of 20%. The inherent viscosity of the polymer was 1.80 dl/gram. The resulting polymer had a conversion of more than 95%.

The bonding material solution was coated on a corona treated side of a 15 cm×50 cm×125 micron optically clear biaxially oriented polyester film using a knife coater at a wet thickness of 225 microns. The coating was dried in an air convection oven for 10 minutes at 82° C. The dry thickness of the coating layer was 25–35 microns. The tacky bonding layer coating was protected by laminating an optically clear silicone coated polyester film to the bonding layer. The stress relaxation of the bonding material layer was measured to be 45% using the "Stress Relaxation Test Procedure Used When the Bonding Layer is Inherently Tacky". The initial haze of the abraded glass ranged from 60–65%. A 50 mm×50 mm sample of the bonding layer coated on the polyester film was cut and the protective liner was removed. The coated polyester was applied onto the same glass surface which had been abraded with a 125 micron diamond abrasive described in Example 1 using a 0.5% Joy™ detergent and water solution at the interface between the coated polyester and the glass in an area where no other second substrate/bonding material combinations had been bonded. The excess solution was forced out of the interface using a squeegee. After a 72-hour dwell on the glass surface the haze through the second substrate/bonding layer/glass laminate was measured to be 8.8%. The 180° peel adhesion to glass was measured using the "180 Degree Peel Adhesion to Glass-Procedure Used When Bonding Layer is Inherently Tacky." The 180° peel adhesion was 1850 g/2.54 cm wide sample and only a slight adhesive residue (less than 5%) was observed on the glass upon removal of the coated polyester. The Visual Acuity was measured at 6 meter/6 meter.

Comparative Example 1

Comparative Example 1 demonstrates the importance of bonding material in obtaining a final article with the desired haze value.

This Comparative Example 1 compares a bonding layer that had low viscoelastic flow properties and thus lower stress relaxation due to crosslinking compared to the bonding material of Example 5 which had a higher stress relaxation value.

Example 5 was repeated with the following exceptions: The bonding material solution was crosslinked with a bis-amide crosslinker. To the bonding material solution, 3.0 percent of 5% bis-amide crosslinker solution in toluene was added and stirred with a propeller mixing blade for 5 minutes. The wet coating thickness of the bonding material was 225 microns. The coating was baked for 10 minutes at 75° C. to evaporate the majority of the solvent and baked 2 minutes at 100° C. to accelerate the crosslinking of the coating. The dried coating thickness was 25–35 microns. The stress relaxation of the bonding layer was measured at 15% when conducted using the "Stress Relaxation Test Procedure Used When the Bonding Layer is Inherently Tacky". The haze through the second substrate/bonding material layer/glass laminate after a 72 hour dwell using the procedure described in Example 1 was 27%. The Visual Acuity was measured at 6 meter/15 meter. The 180° peel adhesion to glass was measured using the "180 Degree Peel Adhesion to Glass-Procedure Used When Bonding Layer is Inherently Tacky." The 180° peel adhesion was 125 g/2.54 cm wide sample and no residue was observed on removal of the second substrate/bonding material combination. The bonding material apparently did not have the flow properties needed to restore optical clarity of the glass after a dwell time of 72 hours as evidenced by the haze value.

Example 6

Example 1 was repeated except that the bonding layer was coated on the non-hard coated surface of a 175 micron optically clear polyester film with a 10 micron hard coat. The hard coated polyester film was obtained from the Furon Corporation of Worcester Mass. under the product name 007PET/0270X Hard coat. The second substrate/bonding layer combination was applied to the abraded area of the same abraded piece of safety glass as in Example 1 but not on top of any other second substrate/bonding layer combination. The stress relaxation of the bonding layer was measured at 71% when conducted the "Stress Relaxation Test Procedure Used When the Bonding Layer is Inherently Tacky." The haze through the polyester/bonding layer/glass laminate after 72 hours using the procedure described in Example 1 was 5.6%. The 180° peel adhesion to glass was 457 g/2.54 cm wide. The adhesion was measured using the "180 Degree Peel Adhesion to Glass-Procedure Used When Bonding Layer is Inherently Tacky." No adhesive residue was observed upon removal of the polyester/bonding layer combination. The Visual Acuity was measured at 6 meter/6 meter.

Example 7

Example 1 was repeated with the following exceptions:

The bonding layer used was a polyhexene and the second substrate film used was a 175-micron thick optically clear polyester with a 10 micron hard coat. The bonding layer was coated on the non-hard coated surface of the polyester film. The hard coated film was obtained from the Furon Corporation of Worcester, Mass. under the product name 007PET/0270X.

A bonding layer was prepared using a polyhexene with an inherent viscosity of 3.0 dl/gram. The polyhexene was prepared using a process described in U.S. Pat. No. 5,644,007, issued on Jul. 1, 1997 and assigned to 3M Company, incorporated by reference herein. The polyhexene was prepared using 0.2–0.3 g of a Ziegler-Natta catalyst Lynx™ 715 per kg of monomer. Lynx™ 715 is $TiCl_4$ supported on $MgCl_2$ powder and is commercially available from Catalyst Resources Inc. This catalyst is discussed in Boor, Ziegler-Natta Catalysts and Polymerizations, "Polymerization of Monomers," Ch. 19, pp. 512–562, Academic. The conversion rate was 15%. The bonding material was coated on the non-hard coated surface of the polyester film using a knife coater with a gap of 15 mils. The coating was dried 10 minutes at 80° C. The dry thickness of the coating was 50 microns.

The second substrate bonding material combination was applied to the abraded area of the same abraded piece of safety glass as in Example 1 but not on top of another second substrate/bonding material combination. The stress relaxation of the bonding layer was measured at 59% when conducted using the "Stress Relaxation Test Procedure Used When the Bonding Layer is Inherently Tacky." The haze of the sample applied to the abraded panel after a 72 hour dwell at room temperature using the procedure described in Example 1 was 5.5%. The 180°peel adhesion to glass was 153g/2.54 cm wide sample. The adhesion was measured using the "180 Degree Peel Adhesion to Glass-Procedure Used When Bonding Layer is Inherently Tacky". No adhesive residue was observed on removal. The Visual Acuity was measured at 6 meter/6 meter.

Example 8

First, 90 grams of isooctyl acrylate, 10 grams of acrylic acid and 0.24 gram of Irgacure™ 651 (available from the Ciba Specialty Chemicals Corporation of Tarrytown N.Y.) were added to a clear approximately 0.2 liter glass jar. A glass pipet was fastened to a nitrogen gas line with a rubber hose and the pipet was inserted into the solution. The nitrogen was allowed to bubble in the solution for 10 minutes to remove the majority of oxygen in the solution. The pipet was removed and the jar was covered with an airtight lid. The jar was swirled in front of a UV light source for about 10 seconds or until the Brookfield viscosity of the solution was approximately 1500–3000 cps. (Light source= F15T8/350BL 15 watt bulb from General Electric). To this solution 5 grams of 1,6-hexanediol diacrylate was added and stirred into the reactive bonding material mechanically until the solution was homogenous. The solution was allowed to sit at room temperature for 3 hours to allow bubbles to flow to the surface.

The stress relaxation of the cured bonding layer was measured at 40% using the procedure outlined for the "Stress Relaxation Procedure When Bonding Layer is Comprised of a Reactive Liquid".

To make a laminate article, approximately 5 grams of the same solution was applied to the same 30 cm×30 cm glass that was abraded with a 125 micron diamond abrasive as described in Example 1. It was applied to an area that did not have another sample applied thereto. A corona treated 125 micron×15 cm×10 cm optically clear polyester film was applied on top of the solution with the corona treated surface adjacent to the reactive bonding layer. The reactive bonding layer was squeezed between the abraded glass panel and the polyester film using a roller such that a substantial area of the glass panel was covered by both the bonding layer and the polyester film. The reactive bonding layer was cured by placing the reactive glass panel under a UV light source so light penetrated through the polyester for 5 minutes (light source=F40/350BL—2 bulbs at a distance of 6 cm from the sample). The haze through the polyester film/reactive bonding layer/glass laminate was measured to be 3.5%. The 180° peel adhesion was measured using the "180° Peel Adhesion to Glass Procedure Used When Bonding Layer is comprised of a Reactive Liquid". The 180° peel adhesion to glass was measured at 170 g/2.54 cm width. The Visual Acuity through the polyester film/reactive bonding layer/glass laminate was measured to be 6 meter/6 meter. The "Scratch Visibility" was measured to be 1.

The foregoing detailed description and Examples have been given for clarity of understanding only. No unnecessary limitations are to understood therefrom. The invention is not limited to the exact details shown and described, for variations obvious to one skilled in the art will be included within the invention defined by the claims.

It is claimed:

1. An article comprising:
   a laminate comprising:
   (a) a first substrate, the first substrate having a first major surface and an opposite second major surface, wherein the first substrate comprises a material selected from the group consisting of glass, plastic and combinations thereof, wherein the first substrate has at least one scratch on its first major surface defining an abraded area and wherein the first major surface of the first substrate has an $R_{max}$ of greater than about 1 micron;
   (b) a second substrate having a first major surface and an opposite second major surface wherein the second substrate comprises immediately before, during and after formation of the laminate a material selected from the group consisting of glass, amorphous plastic in its glassy state, amorphous plastic in its rubbery state, crystalline plastic in its glassy state, crystalline plastic in its rubbery state, and combinations thereof;
   (c) a bonding material layer positioned between the first substrate and the second substrate in a manner to form a laminate, wherein the bonding material layer at least partially fills the scratch(es) and is in contact with at least the abraded area of the first major surface of the first substrate and is in contact with at least a portion of the second major surface of the second substrate;
   wherein a maximum haze value through the laminate is less than about 20 percent.

2. The article of claim 1 wherein the article when subjected to a visual acuity test using a 3 meter Snellen eye chart can allow an observer with 6 meter/6 meter vision to read a line on the eye chart which is indicative of about 6 meter/9 meter vision or better.

3. The article of claim 1 wherein the bonding material layer completely fills the scratch(es) in the first substrate.

4. The article of claim 1 wherein the maximum haze value through the laminate is less than about 10 percent.

5. An article comprising:
   a laminate comprising:
   (a) a first substrate, the first substrate having a first major surface and an opposite second major surface, wherein the first substrate is selected from the group consisting of glass, plastic and combinations thereof;
   wherein the first substrate has an abraded and/or scratched area on its first major surface and wherein the first major surface of the first substrate has a maximum haze value;
   (b) a second substrate having a first major surface and an opposite second major surface, wherein the second substrate comprises, immediately before, during, and after formation of the laminate, a material selected from the group consisting of glass, amorphous plastic in its glassy state, amorphous plastic in its rubbery state, crystalline plastic in its glassy state, crystalline plastic in its rubbery state, and combinations thereof;
   (c) a bonding material layer positioned between the first substrate and the -second substrate in a manner to form a laminate, wherein the bonding material is in contact with at least the abraded area of the first major surface of the first substrate and is in contact with at least a portion of the second major surface of the second substrate;
   wherein a maximum haze value through the laminate is less than about 20 percent; and wherein the maximum haze value through the laminate is less than the maximum haze value of the first substrate.

6. The article of claim 5 wherein the maximum haze value through the laminate is less than about 10 percent.

7. The article of claim 5 wherein the first substrate in (b) has a maximum haze value of about 20 or greater.

8. The article of claim 1 wherein the first substrate has a Scratch Visibility Test rating of 1–2 and the laminate has a Scratch Visibility Test rating of 0–1.

* * * * *

UNITED STATES PATENT AND TRADEMARK OFFICE
CERTIFICATE OF CORRECTION

PATENT NO. : 6,180,245 B1
DATED : January 30, 2001
INVENTOR(S) : Jeffrey R. Janssen, Albert I. Everaerts, Donald R. O'Keefe, and William F. Sheffield It is certified that error appears in the above-identified patent and that said Letters Patent is hereby corrected as shown below:

Column 2,
Line 1, insert period after 1996. Delete *3M$^{TM}$ Pat It$^{TM}$ Lint and Pet Hair Remover 836-D*, http://www.mmm.com/market/omc/catalog/products/p00/p21/p23.html, Sep. 1, 1998.

Column 3,
Line 35, "(b)" should read -- (c) --.
Line 44, "(c)" should read -- (d) --.

Column 10,
Line 37, "thereof The" should read -- thereof. The --.

Column 13,
Line 63, "6 meter/i 8 meter" should read -- 6 meter/18 meter --.
Line 64, "6 meter/i 5 meter should read -- 6 meter/15 meter --.

Signed and Sealed this

Sixth Day of November, 2001

Attest:

NICHOLAS P. GODICI
*Attesting Officer*    *Acting Director of the United States Patent and Trademark Office*